DITHERABLE AND TUNABLE MICROWAVE TUBE HAVING A DITHERED TUNER ACTUATOR OF FIXED LENGTH
Filed June 24, 1966
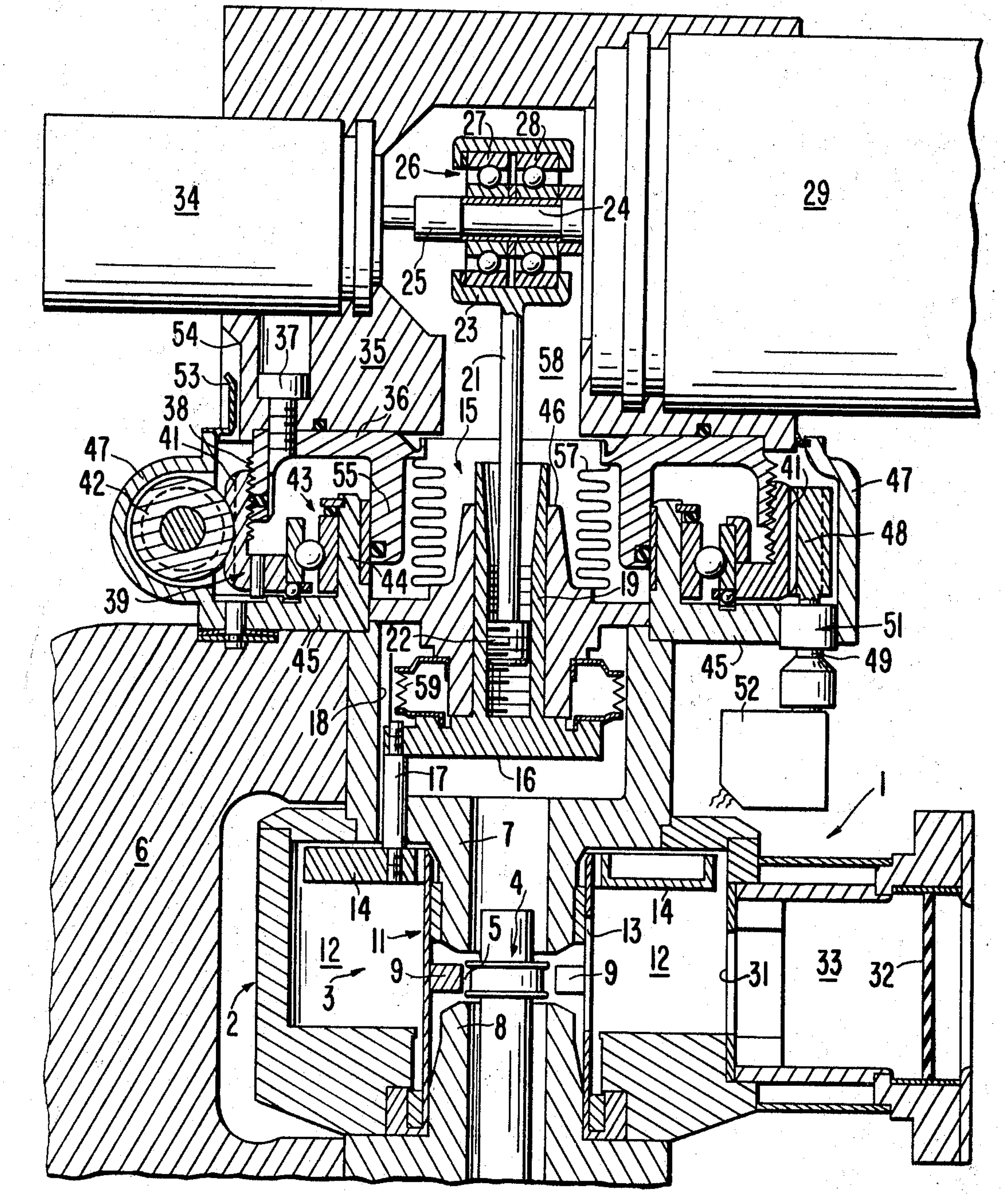
INVENTORS
RICHARD M. HYNES
GEORGE E. GLENFIELD
BY Wm Nolan
ATTORNEY United States Patent Office 3,441,795
Patented Apr. 29, 1969

3,441,795

DITHERABLE AND TUNABLE MICROWAVE TUBE HAVING A DITHERED TUNER ACTUATOR OF FIXED LENGTH

Richard M. Hynes, Westfield, and George E. Glenfield, Scotch Plains, N.J., assignors to S-F-D Laboratories, Inc., Union, N.J., a corporation of New Jersey Filed June 24, 1966, Ser. No. 560,213
Int. Cl. H01j 25/50, 25/58
U.S. Cl. 315—39.61 9 Claims

ABSTRACT OF THE DISCLOSURE

A ditherable and tunable microwave magnetron tube is disclosed. The tube includes a microwave circuit for interaction with an electron stream to produce output microwave energy. The tuning structure is disposed adjacent the microwave circuit for tuning the output wave energy. A tuner actuating rod mechanism is affixed to the tuning structure and extends outwardly of the tube through the tube's envelope. A dithering mechanism is affixed to the tunner actuating rod for diethering the tuning structure within the tube to diether the frequency of the output signal. The dithering mechanism is carried from a platform affixed to the outside of the tube's envelope. The platform is movable with respect to the tube envelope for changing the mean position of the tuning actuating mechanism such that the carrier frequency of the dithered outward signal may be shifted or tuned over a desired range.

Heretofore, dithered (frequency modulated) magnetron oscillators have been employed as the output tubes in microwave radar systems. Such tubes have been very successful in reducing unwanted backscattering such as that produced by ground and sea return. These tubes have included a means such as a resolver for generating a signal representative of the instantaneous frequency deviation of the frequency modulated output. This signal is fed to a local oscillator of the radar for tracking the frequency of the output signal such that the intermediate beat frequency of the radar is held nearly constant. However, means were not provided for tuning the carrier frequency of the tubes over substantial frequency bands such that several radars could be operated separately on different frequencies without mutual interference. In these prior tubes, as exemplified by that described and claimed in copending U.S. application 487,697, filed Sept. 16, 1965, now issued as U.S. Patent 3,414,761 on Dec. 3, 1968 and assigned to the same assignee as the present invention, the turner actuator mechanism was of a fixed length. The problem arises, how to tune such a tube and maintain the turner actuator of fixed length in order to prevent growth in the turner actuator mechanism due to wear and increased play between moving parts with prolonged dithering of the tuner actuator.

In the present invention, the turner actuator mechanism is of fixed length and the actuator mechanism and dithering mechanism is supported from the tube body via an axially movable platform. In this manner the actuator mechanism of fixed length with its dependent tuning plunger and coupled dithering mechanism are all movable with respect to the tube body for tuning the carrier frequency of the tube, whereby growth of the tuner actuator mechanism is prevented with prolonged dithering.

The principal object of the present invention is the provision of an improved ditherable and tunable microwave tube.

One feature of the present invention is the provision of a tuner actuating mechanism having a coupled dithering device both of which are supported from the main body of the tube via the intermediary of a movable platform, whereby the carrier frequency of the tube may be tuned without changing the length of the dithered tuner actuating mechanism.

Another feature of the present invention is the same as the preceding feature wherein the movable platform is translated relative to the tube body by means of an axially expandable threaded coupling.

Other features and advantages of the present invention will become apparent upon a perusal of the following specification taken in connection with the accompanying drawings wherein:

The drawing is a longitudinal view, partly in section, of a microwave tube employing features of the present invention.

Referring now to the drawing, the tube 1 comprises a main body structure 2 which is generally tubular and evacuated to a low pressure as of $10^{-8}$ torr. An annular microwave circuit 3 surrounds a centrally disposed cathode electrode 4 in spaced relat ion therefrom to define an annular electronic interaction region 5. A magnet 6 is disposed externally of the tube body 2 for producing an axially directed magnetic field B in the electronic interaction region 5. Magnetic pole pieces 7 and 8 form part of the tube body structure and mate with the external magnet 6 for concentrating the magnetic field B in the interaction region 5 between the axially opposed ends of the pole pieces 7 and 8, as of iron.

The microwave circuit 3 includes an array of vane resonators 9 projecting inwardly toward the cathode electrode 4 from a tubular anode wall 11. A circular electric mode cavity resonator 12 surrounds the anode wall 11 and communicates with alternate ones of the vane resonators 9 via the intermediary of an array of axially directed slots 13 cut through the anode wall 11. The cavity resonator 12 is dimensioned for operation on the $TE_{0,1,1}$ mode at the operating frequency of the microwave tube 1. An annular tuning plate 14, as of copper, is disposed at, and defines, one axial end of the cavity resonator 12. Axial movement of the tuner ring 14 tunes the microwave circuit 3 by tuning the cavity resonator portion 12 thereof.

An elongated turner actuator rod mechanism 15 is coupled to the tuning ring 14 and extends away from the microwave circuit 3 in a direction coaxial with the tube 1 and through the main body structure 2 of the tube 1. The actuator mechanism 15 includes a spider plate 16 having a plurality of axially directed legs 17, as of cold rolled steel, passing through aligned bores 18 in the pole piece 7 and connected to the tuner ring 14.

The spider 16, as of iron, includes an elongated hollow cylindrical piston portion 19 projecting out of the tube body 2 axially thereof. A thin flexible axial drive shaft 21, as of 0.090" diameter brass rod, is threaded into the piston at its innermost end. A locking plug 22 as of nylon locks the threads of the axial drive shaft 21 to the piston 19. The other end of the flexible axial drive shaft 21 includes a yoke portion 23 concentrically mounted on an eccentrically rotatable portion 24 of a transversely directed rotary drive shaft 25. A ball bearing assembly 26 is housed in the yoke portion 23 to permit the eccentrically rotatable portion of the rotary shaft to freely rotate within the yoke portion. The ball bearing assembly includes an inner cylindrical race member 27 fixedly secured to the rotating shaft 25 and an outer cylindrical race member 28 fixedly secured to the yoke.

The eccentric portion 24 of the rotary drive shaft 25 has its axial centerline offset by about 0.00125" from the axis of rotation of the drive shaft 25. A motor 29 is connected to one end of the shaft 25 for rotating same at about 12,000 r.p.m. to dither the tuner actuator mechanism 15. More specifically, the axial drive shaft 21 with its dependent tuner ring 14 is caused to oscillate axially to and fro by an amount equal to twice the amount of eccentricity of the rotary drive shaft portion 24 or, in the case cited above, by 0.00250". For a microwave circuit 3 tuned for operation at 16 to 17 gHz., this amount of oscillatory motion produces a frequency deviation of plus and minus 10 to 15 mHz. about the carrier frequency of the output signal. The output signal is extracted from the cavity portion 12 of the circuit 3 via an output iris 31, microwave window 32, and waveguide 33. A resolver 34 is coupled to the other end of the rotary drive shaft 25 for deriving an output voltage which is representative of the instantaneous frequency deviation produced by the dithering.

The resolver 34 and motor 29 are mounted in an aluminum tuner housing block 35 which is mounted to an annular movable platform member 36, as of stainless steel, via cap screws 37. The movable platform 36 forms one member of a two member axially expandable threaded coupling mechanism. The platform member includes an outer axially directed skirt portion 38 which is externally threaded. These threads mate with a set of internal threads on a ring gear member 39, as of bronze. The ring gear member 39 has an external set of helical gear teeth 41 which mesh with the teeth on a worm shaft 42. The ring gear 39 is captured against axial translation via a thrust bearing assembly 43 mounted at its inner circumference between the ring gear 39 and an axially directed cylindrical wall portion 44 of a transverse tuner mounting plate 45, as of bronze. A long axially directed cylindrical bearing 46 is centrally disposed of the mounting plate 45 and serves to guide the piston 19 of the tuner actuating mechanism 15. The mounting plate serves to close off, and forms a part of, the upper end of the evacuated tube body structure 2. The plate 45 includes an upwardly directed outer lip 47 which serves to support and house the worm shaft 42 on one side and to house a gear 48 on the other side. The gear 48 is driven from the ring gear 39 and is coupled to a shaft 49 passing through a bearing assembly 51 in the plate 45. The shaft 49 drives a potentiometer 52 to give an output signal representative of the carrier frequency of the microwave output signal. An axially directed guide tab 53 is mounted to the tuner mounting plate 45 above the worm shaft 42. The guide tab 53 rides in an axial key slot 54 in the tuner housing block 35 to restrain rotation of the tuner platform 36. The tuner platform 36 also includes a centrally disposed axially directed bearing member 55 which bears in sliding engagement with the inner surface of the wall portion 44 of the tuner mounting plate 45 to provide guidance and transverse support for the tuner platform 36.

In operation, rotation of worm shaft 42 produces rotation of the captured ring gear 39 which in turn produces axial translation of the tuner platform 36. This produces axial translation of the dither motor and tuner actuator mechanism 15 with the dependent tuner ring 14. The result is a tuning of the carrier frequency of the output signal. In a typical example, the tuner actuator mechanism 15 is movable relative to the fixed tube body structure 2 by about 0.088" for tuning the carrier frequency of the output signal from 16 to 17 gHz.

A spring bellows 57, as of stainless steel, is mounted between the tuner platform 36 and the tuner mounting plate 45 to spring load the mating threads of the ring gear 39 and tuner platform 36 with 22 pounds of force to prevent backlash. In addition, the bellows 57 serves as an oil seal for an oil fill 58 contained inside the tuner housing block 35. The oil fill 58 serves as lubrication for the tuner actuating mechanism 15 and, in addition, provides viscous damping for the dithering motion. A second stainless steel bellows 59 is vacuum sealed at its ends between the spider 16 and the tuner mounting plate 45 to maintain the vacuum integrity of the evacuated tube body structure 2, while permitting motion of the tuner actuator mechanism 15 through the vacuum wall.

The fixed length of dithered tuner actuator mechanism 15, from the point of its attachment to the eccentric shaft 24 to the tuner ring 14, prevents any growth in this frequency determinative element with prolonged dithering as might otherwise occur if it included threaded coupling means for changing its length to tune the carrier frequency.

Since many changes could be made in the construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A ditherable and tunable microwave tube apparatus including, means forming a microwave circuit for supporting wave energy thereon, means for providing a stream of electrons adjacent said circuit means for electromagnetic interaction with the microwaves on said circuit means to produce an output signal, means forming an evacuated main body structure containing said microwave circuit and said electron stream providing means therewithin, means forming a tuning structure operable through a wall of said main body and having a movable portion operable within said evacuated body means adjacent said circuit means for displacing microwave fields of said circuit for tuning the frequency of said output signal, said tuning means also including an elongated actuator mechanism portion extending away from said microwave circuit through a wall of said main body structure, means coupled to said actuator mechanism externally of said evacuated tube body structure for dithering said actuator mechanism to and fro toward and away from said circuit for frequency modulating the output signal, and means supporting said dithering means from said tube body, said support means including a movable support structure having an axially expandable threaded coupling means with a first threaded member threadably mating with a second threaded member, and wherein one of said threaded members is rotatable and axially captured, and said second threaded member is captured against rotation and free to travel axially, whereby rotation of said first member produces axial translation of the other, such that said support means moves said dithering means toward and away from said tube body for moving said tuner actuating means with dependent tuner means toward and away from said circuit to change the carrier frequency of the tube apparatus.

2. The apparatus of claim 1 wherein said elongated tuner actuator mechanism includes a yoke structure at its outer end, wherein said dithering means includes an eccentrically rotatable shaft transversely directed of said elongated tuner actuator, and wherein said yoke structure includes a bearing structure concentrically mounted on said eccentrically rotatable shaft for translating eccentric rotational motion of said shaft into oscillatory motion of said tuner actuator mechanism and tuning member portion.

3. The apparatus of claim 2 wherein said tuner actuator mechanism includes an elongated flexible rod portion affixed at one end to said yoke structure and including an elongated piston structure axially slidable in a fixed cylindrical bearing portion of said tube body and affixed to the other end of said elongated flexible rod portion, whereby side to side whipping motion of the yoke end of said rod is absorbed by flexure of said flexible rod portion without being transmitted through said elongated piston to the portion of said tuning structure inside said tube body structure.

4. The apparatus of clam 3 including a motor for rotatably driving said eccentric shaft, and a transducer means coupled to said motor driven shaft for deriving an output signal representative of the instantaneous frequency deviation of the frequency modulated output microwave signal.

5. The apparatus of claim 1 wherein said rotatable threaded member of said movable support means is a gear, and including a worm gear for driving said first gear.

6. The apparatus of claim 5 including a transducer means coupled to said first gear for deriving an output signal representative of the carrier frequency of the microwave output signal.

7. The apparatus of claim 3 including a flexible gas tight bellows sealed at an end to said ditherable tuner actuator mechanism inwardly of said cylindrical bearing portion of said tube body structure, and sealed at its other end to said tube body structure thereby forming a flexible wall portion of said evacuated tube body structure.

8. The apparatus of claim 1 including spring means coupled between said first and second members of said threaded coupling means for spring loading the mated threads to prevent backlash.

9. The apparatus of claim 8 wherein said spring means is also a fluid tight bellows and is sealed at one end to a fixed wall of said tube body structure, and the other end of said bellows is sealed to said second axially translatable rotationally captured member of said expandable coupling means, and wherein an oil fill is contained by said bellows around said ditherable tuner actuating mechanism for viscous damping and lubrication of said tuner actuating mechanism.

References Cited

UNITED STATES PATENTS

| | | | |
|---|---|---|---|
| 2,589,885 | 3/1952 | Sonkin | 315—39.59 |
| 3,032,681 | 5/1962 | Scanzani | 315—39.61 |
| 3,157,818 | 11/1964 | Olson | 315—39.55 X |

OTHER REFERENCES

Microwaves—New Magnetron Shifts Frequency Fast, by Edwards, Electronics, April 1964.

HERMAN KARL SAALBACH, *Primary Examiner.*

S. CHATMON, Jr., *Assistant Examiner.*

U.S. Cl. X.R.

315—39.75, 39.77; 331—90; 332—5; 333—83